United States Patent Office 3,663,596
Patented May 16, 1972

---

3,663,596
ALIPHATIC ESTERS OF 3,5-DI-ALKYL SALICYLIC ACIDS USEFUL AS UV STABILIZERS FOR THERMOPLASTICS
Hans A. Gersmann, Hendricus A. Oosterhof, and Aart Strang, Amsterdam, Netherlands, assignors to Shell Oil Company, New York, N.Y.
No Drawing. Original application Mar. 1, 1968, Ser. No. 709,811, now Patent No. 3,542,728, dated Nov. 24, 1970. Divided and this application Aug. 10, 1970, Ser. No. 62,672
Int. Cl. C07c 69/76
U.S. Cl. 260—473 S                    5 Claims

ABSTRACT OF THE DISCLOSURE

Thermoplastic compositions comprise as stabilizers against actinic radiation certain esters of mono- or polyvalent saturated non-aromatic alcohols with certain 2-hydroxybenzoic acids having an alkyl or alkoxy substituent in the ring in the 3-position, the 5-position, or both.

---

This application is a division of copending application Ser. No. 709,811, filed Mar. 1, 1968.

The present invention relates to novel compositions comprising a thermoplastic synthetic organic polymer and an ester of the salicylate type.

More especially, thermoplastic compositions are envisaged which show an improved resistance to actinic radiation such as ultraviolet (UV) light because of the presence of certain esters of mono- or polyvalent saturated non-aromatic alcohols with certain 2-hydroxybenzoic acids selected from the group of such acids which have an alkyl or alkoxy substituent in the ring on the 3- or on the 5-position or on both these positions.

A broad, generally useful group of compounds of this type is described herein. It has been found that a limited, selected group thereof is characterized by particularly good stabilizing properties. Claims are asserted herein only to said selected group and compositions stabilized therewith.

It has been found that the esters of the type claimed, when mixed with thermoplastic synthetic organic polymers, impart to these polymers a strikingly high resistance to the action of UV light. Generally, this resistance is much higher than when the salicyclic acid esters known so far for UV-stabilization of thermoplastic synthetic organic polymers are used. Moreover, the esters according to the invention have the advantage over the usually employed aryl esters of salicylic acids of causing no or very little discoloration.

The present esters are easily obtained, many of them by means of a relatively simple alkylation process.

The excellent effect of the use of the esters according to the invention is probably based on the combination of at least the following:

(1) The esters are aliphatic esters which cause less discoloration of the polymer compositions than aromatic esters;

(2) The presence of a hydroxyl group on the ortho-position with respect to the carbonyloxy group brings about intramolecular hydrogen transfer when the ester is irradiated with UV light, thus avoiding extraction of the hydrogen atoms from the polymer, which would increase the sensitivity to decomposition of the polymer by oxidation; and (3) The presence of at least one long-chain alkyl or alkoxy group having a minimum number of carbon atoms efficiently promotes the compatibility of the esters with the polymer;

(4) The presence of an alkyl group on the 3-position stimulates the formation of a hydrogen bridge, which seems to be essential for superior UV-stabilization;

(5) The presence of an alkyl group on both the 3- and the 5-position prevents the formation, by oxidation, of an undesirable stable quinone structure.

The broad group of stabilizers referred to above consists of esters derived from an alcohol of the general formula $R_1(OH)_n$, in which $R_1$ is a mono- or polyvalent saturated aliphatic or cycloaliphatic hydrocarbyl group and $n$ represents an integer equal to the valency of $R_1$, and a 2-hydroxybenzoic acid of the general formula

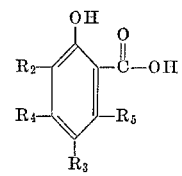

in which one of the radicals represented by $R_2$ and $R_3$ is an alkyl or alkoxy group and the other a similar or dissimilar alkyl or alkoxy groups, a hydrogen atom or a halogen atom, and in which the radicals represented by $R_4$ and $R_5$ are each independently a hydrogen atom or a methyl group, at least one of the radicals $R_1$, $R_2$, and $R_3$ being a group with 8–36 carbon atoms, provided that if one of the radicals $R_2$ and $R_3$ is a hydrogen atom, the other has 10–36 carbon atoms.

The esters referred to herein as "Type I esters" contain only one alkyl or alkoxy substituent present on one of the said two positions and no other substituent on the other.

The esters referred to herein as Type II esters contain substituents in both the 3- and 5-positions. Each of these two substituents may be an alkyl or alkoxy group or only one of them an alkyl or alkoxy group and the other a halogen atom. In both of these cases the esters are moreover characterized by the presence of at least one saturated aliphatic hydrocarbyl group with 8–36 carbon atoms, which group is either an alkyl group attached to the carbonyloxy group or an alkyl or alkoxy group attached to the ring on the 3- or on the 5-position.

Alkyl or alkoxy groups having at least 8 carbon atoms will be indicated hereinafter as "long-chain" groups.

In both the type I esters and the type II esters the 4- and the 6-position are each independently occupied by either a hydrogen atom or a methyl group.

Furthermore, any one of the hydrocarbyl groups occurring in the said esters may contain one or more substituents, e.g., halogen atoms, alkoxy groups or alkylthio groups.

With a view to the stability of the esters themselves against oxidation it will be advantageous if as many as possible of the carbonbound hydrogen atoms occurring in each of the groups represented by $R_1$, $R_2$, or $R_3$ are attached to primary or secondary carbon atoms. Since the alkyl substituents in the ring, in particular those having a long chain, will usually be obtained by alkylation with corresponding olefins, the resulting alkyl groups will have a tertiary alpha-carbon atoms to which a hydrogen atom is bound. In general, therefore, those esters are superior in which in the groups $R_1$, $R_2$, and $R_3$ together, the number of hydrogen atoms attached to a tertiary carbon atom is at most 2.

Furthermore, those type II esters are generally superior which are derived from acids whose radicals $R_2$ and $R_3$ are each independently an alkyl or an alkoxy group, which groups may be similar or dissimilar, and particularly those in which at least one of the groups $R_2$ and $R_3$ is an alkyl or alkoxy group containing 10–36 carbon atoms.

Two categories of these type II esters can be differentiated: (a) those in which at least one of the groups $R_2$ and $R_3$ is an alkyl or alkoxy group containing only 1–5 carbon atoms and (b) those in which both $R_2$ and $R_3$ are similar or dissimilar alkyl groups containing 14–18 carbon atoms and being branched on the alpha-carbon atom.

Particularly recommended esters of the category (a) are those in which either $R_2$ or $R_3$ is a methyl, a tert-butyl, a methoxy or a tert-butoxy group, esters in which $R_2$ is a methyl group being especially preferred.

Very suitable representatives of esters of the category (a) are also those in which only one of the groups $R_2$ and $R_3$ is an alkyl or alkoxy group with 1–5 carbon atoms, especially the groups just mentioned, and the other is an alkyl or alkoxy group containing 14–18 carbon atoms.

As the long-chain alkyl substituents on the 3- and/or the 5-position of type I and type II esters are easily introduced by alkylation with corresponding long-chain olefins, the radicals represented by $R_2$ and $R_3$, as far as they contain at least eight carbon atoms, are generally alkyl groups with branching on the alpha-carbon atom. Preferred representatives of such esters are the type II esters of category (b) mentioned above and representatives of the type II esters of category (a) in which one of the radicals $R_2$ and $R_3$ is a long-chain alkyl group having a tertiary alpha-carbon atom.

Particularly outstanding results are obtained with a limited group of type II esters, namely, esters of the above general formula in which each of the radicals $R_2$ and $R_3$ is an alkyl group, at least one of which has 8–36 carbon atoms, and $R_4$ and $R_5$ are each independently a hydrogen atom or a methyl group.

The valency of the saturated aliphatic alcohols from which the esters of type I or type II are derived preferably does not exceed the number 4. However, the esters may also have been obtained by esterification with alcohols having a higher valency. The hydroxyl groups of the polyvalent alcohols may have been esterified completely or only partially. The preferred number of carbon atoms of both the monovalent and the polyvalent alcohols is less than 10.

Examples of the monovalent alcohols are methanol, ethanol, 1-propanol, 2-propanol, 1-butanol, 2-butanol, 2-methyl-1-propanol, 2-methyl-2-propanol, the pentanols, the hexanols, cyclohexanol, the heptanols, the methylcyclohexanols, the octanols, the nonanols, the decanols, the dodecanols, the tetradecanols, the hexadecanols, the octadecanols, the eicosanols, the hexacosanols, the dotriacontanols and technical mixtures of $C_7$–$C_9$ alkanols or $C_{14}$–$C_{18}$ alkanols, which mixtures may have been produced by carbonylation in the presence of hydrogen (oxo reaction) of a mixture of suitable olefins. The above-mentioned acyclic alcohols with more than four carbon atoms comprise in particular the 1- and the 2-alkanols with straight or branched chains. However, other isomers are not excluded.

Examples of the polyvalent alcohols are ethylene glycol, glycerol and pentaerythritol.

Specific examples of the type I esters are esters of any one of the alcohols mentioned before and any one of the following acids: 3- or 5-($C_{10}$-alkyl)-, 3- or 5-($C_{12}$-alkyl)-, 3- or 5-($C_{14}$-alkyl)-, 3- or 5-($C_{15}$-alkyl)-, 3- or 5-($C_{16}$-alkyl)- and 3- or 5-($C_{18}$-alkyl)-salicylic acids.

Specific examples of the preferred type II esters are esters of any one of the above-mentioned alcohols and any one of the following acids: 3-methyl-5-($C_8$-alkyl)-, 3-methyl - 5 - ($C_9$-alkyl)-, 3 - methyl-5-($C_{10}$ - alkyl)-, 3-methyl-5-($C_{13}$-alkyl)-, 3 - methyl - 5 - ($C_{14}$-alkyl)-, 3-methyl-5-($C_{16}$-alkyl)-, 3-methyl - 5 - ($C_{17}$-alkyl)- and 3-methyl-5-($C_{18}$-alkyl)-salicylic acids, as well as the corresponding acids in which the methyl group is attached on the 5-position and the long-chain alkyl group on the 3-position.

Other type II esters include those in which the methyl group on the 3- or on the 5-position has been replaced by a chlorine atom, a methoxy group, a tert-butyl group or a tert-butoxy group.

Further specific examples of preferred type II esters are esters of any one of the alcohols mentioned before and any one of the following acids: 3,5-di($C_8$-alkyl)-, 3,5-di($C_{10}$-alkyl)-, 3,5 - di($C_{11}$-alkyl), 3,5-di($C_{12}$-alkyl)-, 3,5 - di($C_{14}$-alkyl)-, 3,5-di($C_{15}$-alkyl)-, 3,5-di($C_{16}$-alkyl)-, 3,5-di($C_{18}$-alkyl)- and 3-($C_{14}$-alkyl) - 5 - ($C_{17}$-alkyl)-salicylic acids.

Examples of other type II esters are esters of a saturated aliphatic alcohol having 8–36 carbon atoms and any one of the following acids: 3,5-dimethyl-, 3-methyl-3-tert-butyl-, 3,5-diisopropyl-, 3,5-di-tert-butyl, 5-methyl-3-tert-tbutyl-, 3 - methyl - 5 - cyclohexyl- and 3,5-dicyclohexylsalicylic acids.

When in the specific examples of type I esters and type II esters, mentioned above or to be mentioned afterwards, a long-chain alkyl group is specified by the number of carbon atoms only, e.g., by "($C_{10}$-alkyl)", this means that the chain of 10 carbon atoms may be straight or branched. The said indication also comprises mixtures of esters, in which the separate compounds merely differ in the kind or degree of branching of the alkyl groups, including unbranched chains. As to the esters having two long-chain alkyl groups, both of which are specified by the number of carbon atoms only, compounds having two isomeric alkyl groups in the same molecule are also envisaged.

If the long-chain alkyl ring substituents are branched, the branching usually occurs on the alpha-carbon atom, but instead of or in addition to the said branching these chains may have one or more branchings on other carbon atoms as well.

For example 3,5 - di($C_{16}$ - alkyl) - salicylic acid esters include the esters of 3,5-di-n-hexadecylsalicylic acid, 3-n - hexadecyl - 5 - (1 - methylpentadecyl) - salicylic acid, 3 - (1 - methylpentadecyl) - 5 - (1 - ethyltetradecyl)-salicylic acid, 3,5 - di(1 - methylpentadecyl) - salicylic acid, 3,5 - di(1 - ethyltetradecyl) - salicylic acid, as well as 3 - (1 - methylpentadecyl) - 5 - (1 - ethyl - 2,2,4-trimethyl-undecyl)-salicylic acid.

Esters which differ from the above-mentioned examples of type I or type II esters include those in which one or two long-chain alkyl ring substituents are replaced by a branched or unbranched alkoxy-substituent having the same number of carbon atoms, e.g., the ethyl of 3- or 5-n-hexadecyloxy-salicylic acid, the tert-butyl ester of 3,5-di(n-tetradecyloxy)-salicylic acid, the methyl esters of 3 - (1 - methylpentadecyl) - 5 - (1 - ethyl - tetradecyloxy)-salicylic acid, the ethyl ester of 3-(n-tetradecyloxy)-5-(1-methylheptadecyl)-salicylic acid and the mixture of esters of $C_7$–$C_9$ alkanols and 3-n-octadecyloxy-5-(1-methylheptadecyl)-salicylic acid.

Moreover, in any one of the specific examples mentioned before, either one or both of the hydrogen atoms on the 4- and 6-position may have been replaced by a methyl group.

Stabilized compositions can be prepared by using at least two esters of the types described, differing in one or more of the radicals $R_1$, $R_2$, and $R_3$ with regard to either or both of the number of carbon atoms and the kind (or degree) of branching. The said compositions may, for example, contain a mixture of two or more esters of type I, two or more esters of type II or a mixture of one or more esters of type I with one or more esters of type II, including mixtures of esters of type I or type II having different $R_1$-radicals and being derived from the same acid or from different acids.

Examples of such ester mixtures are mixtures of the ethyl ester of the 3-($C_{16}$-alkyl)-salicylic acids and the ethyl esters of the 5-($C_{16}$-alkyl)-salicylic acids, mixtures of one or both of these two groups of ($C_{16}$-alkyl)-salicylic acid esters together with the ethyl esters of the 3,5-di($C_{16}$- alkyl(-salicylic acids, mixtures of two or more or even all of the ethyl esters of the following monoalkylsalicylic acids: 3-($C_{14}$-alkyl)-, 3-($C_{15}$-alkyl)-, 3-($C_{16}$-alkyl)-, 3-($C_{17}$-alkyl)-, 3-($C_{18}$-alkyl)-, 5-($C_{14}$-alkyl)-, 5-($C_{15}$-alkyl)-, 5-($C_{16}$-alkyl)-, 5-($C_{17}$-alkyl)- and 5-($C_{18}$-alkyl)-salicylic acids, mixtures of two or more or even all of the ethyl esters of 3,5-dialkylsalicylic acids whose alkyl substituents vary from ($C_{14}$-alkyl) to ($C_{18}$-alkyl), including ethyl esters having different alkyl substituents in the 3- and in the 5-position of the same molecule, and mixtures of one or more of these dialkyl-salicylic ethyl esters with one or more of the monoalkylsalicylic acid ethyl esters mentioned just now. Instead of the ethyl esters the corresponding esters of other alkanols, e.g., methanol or 2-methyl-2-propanol may serve just as well.

Other examples of stabilizing ester mixtures are those derived from the same acid or the same mixture of acids, but from different alcohols, e.g., from two or more of the following alcohols: methanol, 2-methyl-2-propanol, n-octanol, 2-ethylhexanol, a saturated aliphatic alcohol with more than eight, e.g., 14–18, carbon atoms and from a $C_7$–$C_9$- or $C_{14}$–$C_{18}$-alkanol mixture.

Still other examples of ester mixtures of the methyl, the ethyl, the tert-butyl or the ($C_7$–$C_9$-alkyl) ester of two or more 5-alkyl-2,3-cresotic acids, and/or 3-alkyl-2,5-cresotic acids.

Although the present esters are to be used primarily in compositions of thermoplastic synthetic organic polymers, they may also be applied in compositions of other organic polymers, e.g., thermosetting resins, such as, for example, unsaturated polyesters and natural or synthetic rubbers.

If desired, the novel esters are also useful for preparing light-stable or light-stabilizing composition of organic materials which do not have a thermoplastic, rubbery or thermosetting character, e.g., oils, fats, creams, etc.

As to the thermoplastics, the homopolymers or copolymers of monoolefins, e.g., ethylene and in particular propylene, are the most important polymer components of the compositions claimed. In spite of their very great sensitivity to UV light, which is greater for polypropylene than for polyethylene, these thermoplastic polymers can be very well protected against the consequences thereof by using one or more of the esters according to the invention. The polyolefins referred to include particularly so-called linear high density polyethylene and stereoregular polypropylene, such as prevailingly isotactic polypropylene.

Though somewhat less sensitive to UV light than the olefin polymers, other thermoplastic polymers which are also especially suited to be mixed with the above-mentioned esters are the homopolymers or copolymers of vinylchloride and the linear polyesters obtained by homopolymerization or copolymerization of a lactone, particularly α-dimethyl-β-propiolactone.

Still other examples of thermoplastic polymers which may be light-stabilized according to the invention are the homopolymers or copolymers of vinylacetate, vinyl pivalate, acrylonitrile or styrene, as well as polyamides and polyethylene terephthalate.

Stabilized compositions comprising the described esters, may be prepared by mixing one or more thermoplastic polymers with one or more esters of the types described. As a rule the quantity of ester or mixture of esters amounts to 0.1–5.0% w., calculated on polymer. If desired, higher or lower ester concentrations may also be used; the preferred quantities are 0.5–2.0% w., on polymer.

Usually the present compositions are employed for the manufacture of shaped articles.

Those esters of the types described hereinbefore in which either $R_2$ or $R_3$ is a hydrogen atom, the long-chain ring substituent consequently being an alkyl or alkoxy group with 10–36 carbon atoms, are novel compounds. The same is true for those esters in which $R_2$ and $R_3$ are similar or dissimilar alkyl or alkoxy groups, at least one of which having at least ten, i.e., 10–36, carbon atoms, as well as for those representatives in which $R_2$ and $R_3$ are similar or dissimilar alkyl or alkoxy groups and $R_1$ has more than eight, i.e., 9–36, carbon atoms.

The novel esters may be prepared by methods which in general are known in the art, preferably by esterification of the appropriate carboxylic acid with the appropriate aliphatic alcohol. The appropriate carboxylic acids to be esterified are compounds which are also known in the art and which may be obtained by, for example, alkylation of salicylic acid, 2,3-cresotic acid or 2,5-cresotic acid with a straight-chain or branched mono-olefin, having the required number of carbon atoms. The alkylation may also be carried out by means of mixtures of olefins, differing in either or both of the number of carbon atoms and the kind (or degree) of branching. Furthermore, the position of the olefinic double bond may vary from one olefin to the other, but generally α-olefins are used. As a rule a Friedel-Crafts-type catalyst, e.g., $BF_3$, is needed for the said alkylations.

Another attractive method for preparing the appropriate carboxylic acids is a process in which phenol, orthocresol or para-cresol is alkylated with one or more of the olefins just mentioned and alkylated phenols thus obtained are subsequently converted into the corresponding orthohydroxycarboxylic acids by carboxylation with carbon dioxide. These alkylations are usually carried out in the presence of $ZnCl_2$ and HCl or of a silica-alumina-type catalyst, e.g., a montmorillonite, activated with a mineral acid.

Instead of alkylations by means of olefins other alkylation methods known in the art may be employed as well.

The novel esters having alkoxy groups as ring substituents can also be prepared in various ways, e.g., by reaction of alkali phenolate or alkali resorcinolate with a dialkyl sulphate or an alkyl halide having the required number of carbon atoms per alkyl group, then introducing an isopropyl group into the resultant mono-alkoxy- or meta-dialkoxybenzene by mono-alkylation with propene, oxidizing the isopropyl group into an isopropyl hydroperoxide group, decomposing the said hydroperoxide group into a hydroxyl group and carboxylating the 2,4-dialkoxy phenols so prepared into the corresponding 3,5-dialkoxysalicylic acids, and finally esterifying these acids into the desired esters. The sequence of the steps preceding the hydroperoxidation may be changed in that phenol or resorcinol is first mono-alkylated into ortho-isopropyl phenol or 2,4-dihydroxycumene, whereupon the hydroxyl group of the said isopropyl phenols is converted into the desired alkoxy groups by reaction of the alkali phenolates with a dialkyl sulphate or alkyl halide.

Instead of resorcinol (or its alkali salt) a meta-alkyl or a meta-alkoxy phenol (or their alkali salts) may be used, e.g., meta-cresol, meta-ethyl phenol, meta-isopropyl phenol, meta-tert-butyl phenol, meta-methoxy phenol, meta-ethoxy phenol or meta-tert-butoxy phenol (or their alkali salts).

One may also start from guaiacol or ortho-vanillic acid, which compounds need only be alkylated to produce the appropriate carboxylic acid to be esterified.

Still other base materials are mono-aminobenzene or meta-diaminobenzene, which may be converted into the corresponding mono- or dialkoxybenzenes by boiling their diazonium salts with a saturated aliphatic monovalent alcohol having the required number of carbon atoms. The mono- or dialkoxybenzenes thus produced may then be isopropylated into mono- or dialkoxycumenes, which can be converted into the desired esters by hydroperoxidation, decomposition, carboxylation and esterification as described before. In place of meta-diaminobenzene a meta-alkyl or a meta-alkoxyaniline may be employed, e.g., those having an alkyl or alkoxy group with 1–5 carbon atoms.

EXAMPLES

A number of compounds identified in the table below were evaluated as UV stabilizer for solid (isotactic-type) polypropylene (experiments 2–15). The evaluations were carried out with compositions, each of which consisted of a mixture of the same propylpropylene with 1% w. of the ester tabulated, 0.05% w. of 1,3,5-trimethyl-2,4,6-tri(3,5-di-tert-butyl-4-hydroxybenzyl)benzene and 0.3% w. dilauryl thiodipropionate, all percentages being calculated on polypropylene. The last-mentioned two compounds were added in order to ensure sufficient heat stabilization.

For comparison a composition of the same polypropylene containing the same quantities of the same heat stabilizers, but no other additive was tested also (experiment 1).

The UV-stabilizing effect of the additives used was judged with the aid of a Xenontest Fadeometer in which compression-molded sheets of the compositions were exposed to an artificial source of UV-light radiation. The resulting degradation was followed by determination of the intrinsic viscosity (I.V.) of the composition at 135° C. in decahydronaphthalene before the exposure and after exposure for 200, 600 and 1000 hours. After the 1000 hours' exposure the discoloration of the composition was noted also. The results are shown in the table.

TABLE

| Exp. No. | Type of UV-stabilizer | I.V. in dl./g. of the composition after exposure for— | | | | Yellowing after exposure for 1,000 hr. |
|---|---|---|---|---|---|---|
| | | 0 hr. | 200 hr. | 600 hr. | 1,000 hr. | |
| 1 | None | 2.4 | 1.9 | 0.9 | | |
| 2 | A mixture of ethyl esters obtained from a mixture of 3-methyl-5-(C₁₆-alkyl)-salicylic acids.¹ | 2.4 | 2.2 | 2.0 | 1.9 | None to hardly any. |
| 3 | A mixture of ethyl esters obtained from a mixture of 3,5-di(C₁₆-alkyl)-salicylic acids.¹ | 2.4 | 2.2 | 2.0 | 1.9 | Do. |
| 4 | A mixture of ethyl esters obtained from a mixture of acids containing about equal parts by weight of 3,5-di(C₁₄-C₁₆-alkyl)-salicylic acids and mono(C₁₄-C₁₆-alkyl) salicylic acids.³ | 2.4 | 2.3 | 2.1 | 1.9 | Do. |
| 5 | A mixture of C₇-C₉-alkyl esters of 3-methyl-5-(C₁₆-alkyl)salicylic acids.¹ | 2.4 | 2.2 | 2.1 | 1.9 | Do. |
| 6 | The methyl ester of 3,5-di-(1-methylheptyl)-salicylic acid. | 2.4 | 2.3 | 2.1 | 1.9 | Do. |
| 7 | A mixture of ethyl esters obtained from a mixture of 3-(C₁₆-alkyl)-salicylic acids.¹ | 2.4 | 2.2 | 2.0 | 1.8 | Do. |
| 8 | A mixture of ethyl esters obtained from a mixture of acids, mainly consisting of 3-(C₁₄-C₁₆-alkyl)- and 5-C₁₄-C₁₆-alkyl)-salicylic acids.² | 2.4 | 2.2 | 2.0 | 1.8 | Do. |
| 9 | The methyl ester of 5-(1-methylnonyl)salicylic acid. | 2.4 | 2.2 | 1.9 | 1.7 | Do. |
| 10 | The phenyl ester of 3,5-diisopropylsalicylic acid. | 2.4 | 2.0 | 1.5 | 1.1 | Slight. |
| 11 | The methyl ester of 5-(1-methylheptyl)-salicylic acid. | 2.4 | 2.1 | 1.7 | 1.2 | None to hardly any. |
| 12 | The n-octadecyl ester of 3-methylsalicylic acid. | 2.4 | 2.0 | 1.2 | | Do. |
| 13 | The n-hexadecyl ester of 3,5-diisopropyl-4-hydroxy-benzoic acid. | 2.4 | 2.0 | 1.5 | 1.0 | Do. |
| 14 | The n-hexadecyl ester of 3,5-di(diisobutyl-4-hydroxy benzoic acid. | 2.4 | 2.1 | 1.6 | 1.2 | Slight. |
| 15 | "Tinuvin 326" ⁴ | 2.4 | 2.2 | 2.1 | 1.9 | More than slight. |

¹ These acids only differed in the kind of branching of the C-₆-alkyl groups which were mainly 1-methyl-pentadecyl or 1-ethyl-tetradecyl groups.
² This mixture of acids contained about 85% w. of mono-alkyl-salicylic acids (about 70% being 3-alkyl and about 30% 5-alkyl) and about 15% w. of 3,5-di(C₁₄-C₁₆ alkyl)-salicylic acids, and was prepared by alkylation of phenol with a mixture of C₁₄-C₁₆-mono-olefins (molar ratio phenol:olefins =1.3:1) at about 200° C. in the presence of a silica-alumina type catalyst followed by carboxylation with CO₂; the olefins were obtained by cracking refined cycle oil.
³ This mixture of acids contained about 48% w. of dialkylsalicylic acids, about 37% w. of 5-alkyl- and about 15% w. of 3-alkylsalicylic acids, and was prepared by alkylation of salicylic acid with a mixture of C₁₄-C₁₆-mono-olefins (molar ratio phenol:olefins=1:2.5) at about 120° C. in the presence of BF₃; the olefins were obtained by cracking urea-extracted wax.
⁴ Commercial UV stabilizer of the benzotriazole type.

We claim as our invention:

1. An ester

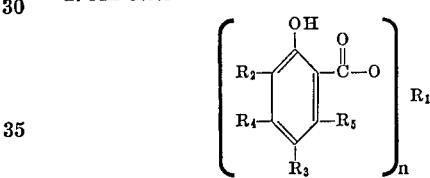

wherein R₁ is a saturated aliphatic or cyclohexyl group of 1 to 32 carbon atoms; n represents an integer from 1 to 4, equal to the valence of R₁; each of the radicals represented by R₂ and R₃ is an alkyl group of 1–18 carbon atoms; at least one of the radicals represented by R₂ and R₃ contains 14–18 carbon atoms; and each of radical R₄ and R₅ is hydrogen.

2. Ester of claim 1 wherein R₂ is a methyl group.

3. Ester of claim 1 wherein one of the groups R₂ and R₃ is an alkyl group of 1–5 carbon atoms and the other is an alkyl group of 14–18 carbon atoms.

4. Ester of claim 1 wherein R₁ is ethyl, R₂ is 1-methylpentadecyl or 1-ethyltetradecyl and R₃ is methyl.

5. Ester of claim 1 wherein R₁ is ethyl and R₂ and R₃ are 1-methylpentadecyl or 1-ethyltetradecyl groups.

References Cited

UNITED STATES PATENTS 3,076,017    1/1963    Grisley _____ 260—474

OTHER REFERENCES

Gellerman et al.: Chem. Abst. 68 101671d (1968).

LORRAINE A. WEINBERGER, Primary Examiner

J. F. TERAPANE, Assistant Examiner

U.S. Cl. X.R.

260—45.85, 810